(12) United States Patent
Spitz (10) Patent No.: US 10,995,722 B2
(45) Date of Patent: May 4, 2021

(54) WORK VEHICLE HAVING ENGINE DRIVE CHECKING CIRCUIT

(71) Applicant: KUBOTA CORPORATION, Osaka (JP)

(72) Inventor: David Spitz, Atlanta, GA (US)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 16/134,181

(22) Filed: Sep. 18, 2018

(65) Prior Publication Data
US 2020/0088150 A1   Mar. 19, 2020

(51) Int. Cl.
*F02N 11/10* (2006.01)
*F16H 63/50* (2006.01)
*F02N 11/08* (2006.01)
*F02D 41/04* (2006.01)
*A01D 34/82* (2006.01)
*A01D 34/00* (2006.01)
*A01D 101/00* (2006.01)

(52) U.S. Cl.
CPC .......... *F02N 11/103* (2013.01); *A01D 34/006* (2013.01); *A01D 34/828* (2013.01); *F02D 41/042* (2013.01); *F02N 11/087* (2013.01); *F02N 11/101* (2013.01); *F16H 63/50* (2013.01); *A01D 2101/00* (2013.01); *F02N 2200/0802* (2013.01); *F02N 2200/0812* (2013.01); *F02N 2200/106* (2013.01)

(58) Field of Classification Search
CPC ................ F02N 11/101; F02N 11/103; B60W 2050/146
See application file for complete search history.

(56) References Cited

U.S. PATENT DOCUMENTS

| 8,888,133 B2 | 11/2014 | Tsuchihashi et al. |
| 9,446,705 B2* | 9/2016 | Dwyer ............... A01D 34/6818 |
| 2010/0114464 A1* | 5/2010 | Miller .................. B60K 28/04 701/113 |

FOREIGN PATENT DOCUMENTS

JP   2005-273539 A   10/2005

* cited by examiner

*Primary Examiner* — Erin D Bishop
(74) *Attorney, Agent, or Firm* — Greenblum & Bernstein, P.L.C.

(57) ABSTRACT

A work vehicle includes an engine controller for driving an engine, a power supply line, a power supply control line, and a display signal line. When a check switch switchable into a safe position corresponding to safe drive of the engine and a non-safe position is switched to the safe position, the power supply control line renders a power supply relay ON. The display signal line transmits a signal indicative of the switched state of the check switch to a display.

5 Claims, 5 Drawing Sheets

WORK VEHICLE HAVING ENGINE DRIVE CHECKING CIRCUIT

TECHNICAL FIELD

The present invention relates to a work vehicle having a function for checking states of a vehicle body required for safe driving of an engine.

BACKGROUND

A work vehicle disclosed in Japanese Unexamined Patent Application Publication No. 2005-273539 includes a speed changer switch for detecting whether a speed changer device is under a neutral state or not, a brake switch for detecting whether a brake is under a braking state or not, an implement switch for detecting whether an implement clutch is under a transmitting state or not, a seat switch for detecting whether a driver's seat is under a seated state or not, and a relay switch for switching conduction states between a state for allowing startup of an engine and a state for inhibiting engine startup. In case the speed changer switch detects the neutral state of the speed changer device, the brake switch detects the braking state of the brake switch, the implement switch detects non-transmitting state of the implement clutch and the seat switch detects the seated state of the driver' seat, startup of the engine is allowed. With this arrangement, it is possible to prevent startup of the engine when an operator is away from the driver's seat. And, it is also possible to avoid occurrence of inconvenience of inadvertent start of the vehicle body or activation of the implement in association with startup of the engine. However, with such engine drive checking system, the driver cannot know the reason when the engine is not started. So, the driver needs to find a reason why the engine is not started.

A work vehicle disclosed in U.S. Pat. No. 8,888,133 (corresponding to Japanese Unexamined Patent Application Publication No. 2005-273539) allows a driver to visually recognize through illumination of LED, states of e.g. battery charge, parking brake, headlamp, PTO clutch, etc. Further, ON/OFF of the parking brake is a condition for engine start. To this end, a detection signal of a parking sensor for detecting ON/OFF position of the parking brake is inputted to an engine ECU to be used for determination of allowing or not allowing engine start. With this arrangement, in case the LED of the parking brake is lit (parking brake ON) although engine start inhibiting message is being displayed, the driver can determine that although the start condition relating to the parking brake is satisfied, some further engine starting condition than the parking brake is not. However, such system as above in which many sensor signals relating to engine start conditions are inputted to the engine ECU and this engine ECU determines whether the engine can be started or not, employs a microcomputer, thus requiring cost for software, as well as cost for a measure to be taken for protection of the microcomputer and its peripheral devices that are vulnerable to exposure to rainwater, dust, etc.

SUMMARY OF THE INVENTION

An object of the present invention is to provide the function of checking vehicle body states required for safe driving of an engine, in an inexpensive and maintenance-easy manner, without using such delicate electronic device as a microcomputer.

A work vehicle according to the present invention comprises:

an engine controller for driving an engine;

a check switch switchable into a safe position corresponding to safe drive of the engine and a non-safe position;

a power supply line having a power supply relay and supplying electric power to the engine controller when the power supply line is ON;

a power supply control line incorporating the check switch and rendering the power supply relay ON when the check switch is switched to the safe position;

a display for displaying a switched state of the check switch; and a display signal line connecting the check switch to the display and transmitting a signal indicative of the switched state.

With the above work vehicle, there is(are) provided one or more check switch(es) for detecting a conditional event for determining whether conditions for safe drive of the engine are satisfied or not, namely, whether an engine safe drive state or non-safe drive state. Therefore, electric power is supplied to the engine controller only when all check switches are set at the safe positions, thus guaranteeing safe drive of the engine. If even one check switch detects the non-safe state, the engine is not started. Further, since the check switch is connected to the display via the display signal line, the detection state of the switch (conditional event for safe drive of engine) can be directly confirmed via the display. As no delicate electronic device such as a microcomputer is present between the check switch and the display, the function of checking vehicle body states required for safe driving of an engine can be realized in an inexpensive and maintenance-easy manner.

Specifically, as examples of the "check switch", there can be cited a seat switch for detecting whether a driver's seat is under a seated state or not, a brake switch for detecting whether a brake is under a braking state or not, a PTO switch for detecting whether a PTO clutch for switching transmission state of a PTO mechanism is under a transmitting state or not, and a speed changer switch for detecting whether a speed changer device is under a neutral state or not. And, in the power supply line, there is provided the power supply relay switch which is turned ON only when all of the above check switches are under safe states (ON states). When the power supply relay switch is ON, electric power is supplied via the power supply line to the engine controller, which in turn drives the engine. In this, if there are provided a seat lamp which is lit when the seat switch is ON (seated state), a brake lamp which is lit when the brake switch is ON (braking state), a PTO lamp which is lit when the PTO switch is ON (non-transmitting state) and a neutral lamp which is lit when the speed changer switch is ON (neutral state) as the "display", the states of the conditional events for safe drive of the engine can be recognized at a glance. For instance, if it is arranged such that the lamps or the like are lit with flow of electric current flowing through the respective check switches in the display signal line in case the switch positions of the check switches are the safe positions, displaying of states of the check switch is made possible by a simple wiring arrangement.

DETAILED DESCRIPTION

Figure 1:
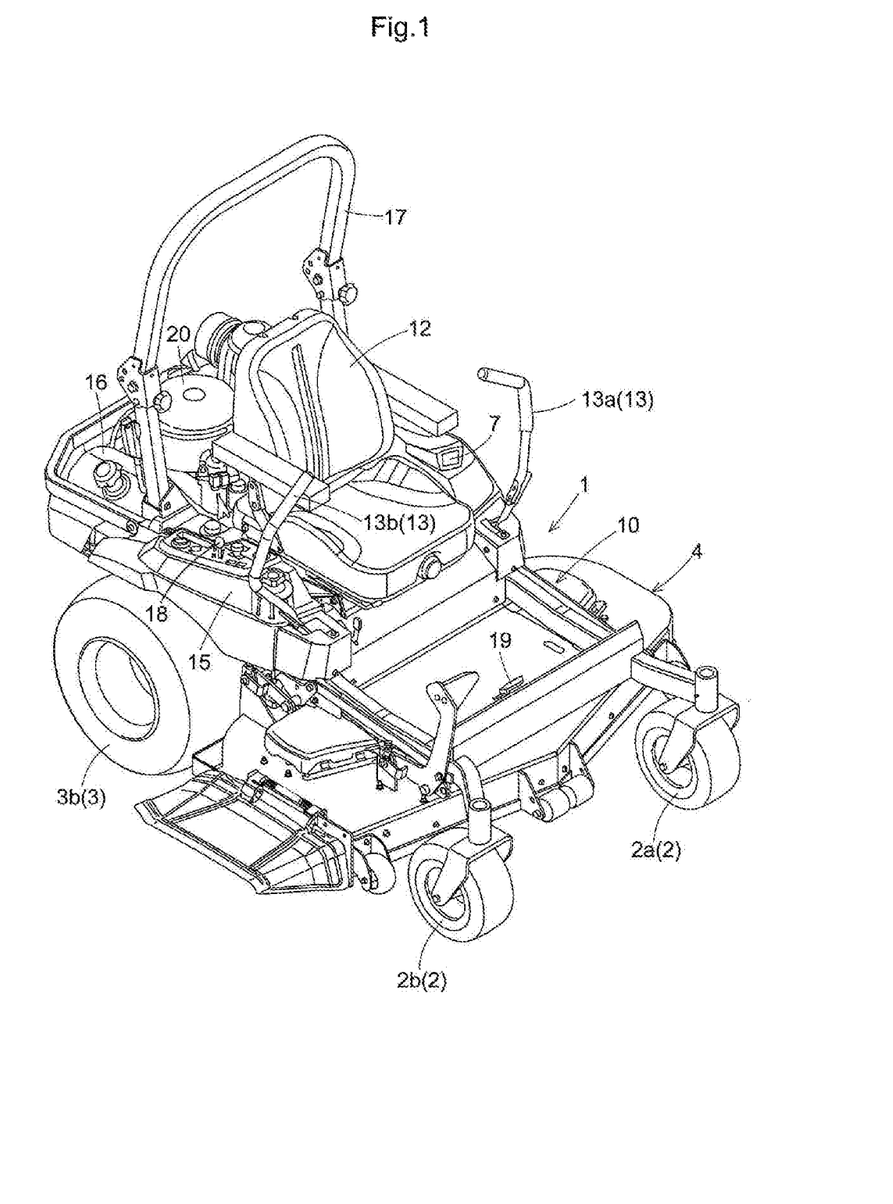
FIG. 1 is a perspective view of a grass mower.
Figure 2:
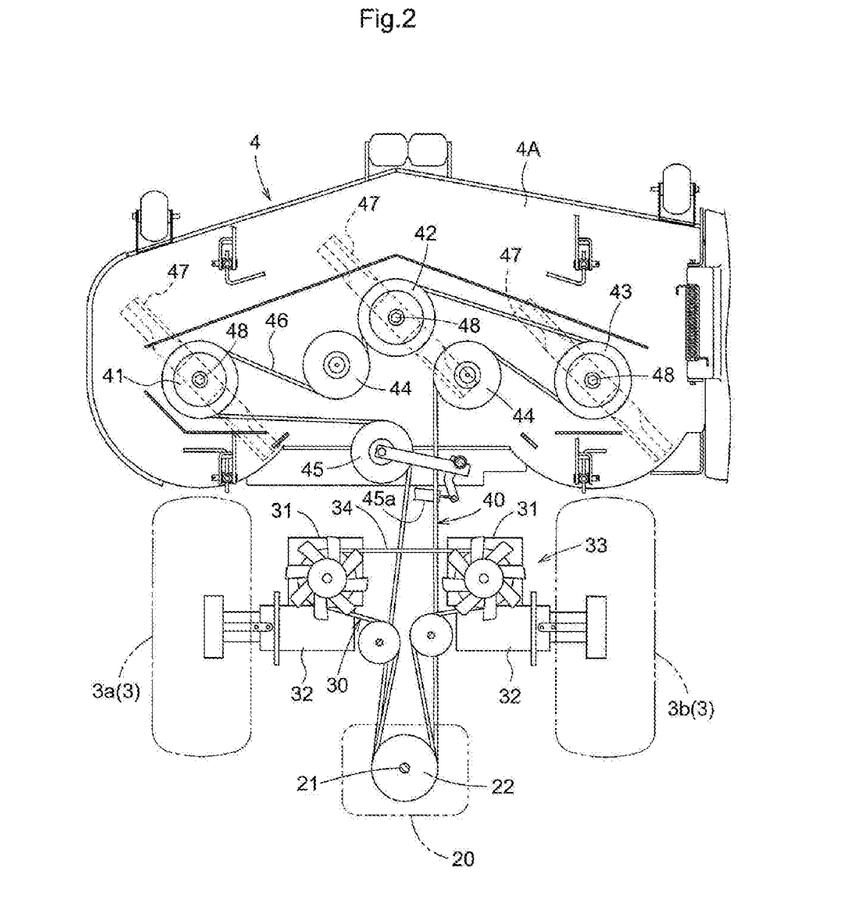
FIG. 2 is a plan view showing power transmission route of the grass mower.

Next, a grass mower as one embodiment of a work vehicle relating to the present invention will be explained with reference to the accompanying drawings. FIG. 1 is a perspective view of the grass mower. FIG. 2 is a power system diagram of the grass mower. Incidentally, in this detailed description, unless indicated explicitly otherwise, a word "front" means the front (forward) side in a vehicle front-rear direction (traveling direction) and a word "rear" means the rear side with respect to the vehicle front-rear direction (traveling direction). Further, a left-right direction or a transverse direction means a vehicle body transverse direction (vehicle body width direction) perpendicular to the vehicle body front-rear direction. A word "upper" or "lower" designates positional relationship with respect to the perpendicular direction of the vehicle body (vertical direction), indicative of a relationship regarding a ground-clearance height.

The grass mower includes a vehicle body 1 supported on a ground surface by means of a front wheel unit 2 as a caster unit and a rear wheel unit 3 as a traveling device. This grass mower is a so-called zero-turn mower, so that a left rear wheel 3a and a right rear wheel 3b together constituting the rear wheel unit 3 can be controlled in their forward and reverse directions as well as their speeds independently of each other. The front wheel unit 2 includes a left front wheel 2a and a right front wheel 2b. The principal component of the vehicle body 1 is a frame 10 consisting of angular pipe members, etc. Between the front wheel unit 2 and the rear wheel unit 3, a mower unit 4 as an implement (or utility implement) is suspended from the frame 10 to be liftable up/down.

The frame 10 extends in the front-rear direction and at the center portion of the frame 10, a driver's seat 12 is provided. On an upper face of a front portion of the frame 10, a floor plate is disposed to be used as a foot rest for a driver. At a front rear of the floor plate, a brake pedal 19 is provided.

An engine 20 for supplying rotational power to the rear wheel unit 3 and the mower unit 4 is mounted at a rear portion of the frame 10. The engine 20 consumes fossil fuel such as heavy oil, gasoline, etc. The engine 20 is disposed under a posture with its output shaft 21 (see FIG. 2) protruding downwards. On a lateral side of the engine 20, a fuel tank 16 is disposed.

Rearwardly of the driver's seat 12, an arch-shaped ROPS 17 is mounted vertically. On the left and right opposed sides of the driver's seat 12, fenders 15 are provided. On top faces of the fenders 15, user control devices such as various kinds of control levers, control buttons, etc. are disposed. On the top face of the left fender 15, a display unit 7 constituted as a meter panel is attached at a position readily seen from a driver seated at the driver's seat 12. On the top face of the right fender 15, a PTO clutch lever 18 is attached.

A maneuvering unit 13 as one of user operable devices consists of a left maneuvering lever 13a disposed on the left side of the driver's seat 12 and a right maneuvering lever 13b disposed on the right side of the driver's seat 12. The left maneuvering lever 13a is used for adjusting a rotational speed of the left rear wheel 3a. The right maneuvering lever 13b is used for adjusting a rotational speed of the right rear wheel 3b. The left maneuvering lever 13a and the right maneuvering lever 13b can be pivotally displaceable among/across a forward speed changing range, neutral and a reverse speed changing range.

As shown schematically in FIG. 2, the power transmission line includes a traveling transmission mechanism 30 for transmitting engine power to the rear wheel unit 3 and a PTO transmission mechanism 40 for transmitting engine power to the mower unit 4. Power from the engine 20 is outputted via vertically two-stages of output pulleys 22 attached to the engine output shaft 21.

The traveling transmission mechanism 30 includes a pair of left and right HST (hydrostatic transmission) 31, a pair of left and right gear transmission mechanisms 32 and a traveling belt transmission mechanism 33. The traveling belt transmission mechanism 33 transmits power outputted from the output pulleys 22 to the HST(s) 31 via a traveling belt 34. The gear transmission mechanisms 33 transmit power speed changed by the HST(s) to the rear wheel unit 3 (left rear wheel 3a, right rear wheel 3b) as "rear wheels".

Speed changing operations of the left and right HST's 31 are effected according to control signals which are generated based on pivotal operations of the left maneuvering lever 13a and the right maneuvering lever 13b. In accordance with user operations on the left maneuvering lever 13a and the right maneuvering lever 13b, there are realized a stop state, a straight traveling state, a gentle turning state a pivot turning state and a spin turning state, respectively. The stop state is realized by stopping the left rear wheel 3a and the right rear wheel 3b. The straight traveling state is realized by forwardly driving or reversely driving the left rear wheel 3a and the right rear wheel 3b at an equal speed. The gentle turning state is realized by forwardly driving or reversely driving the left rear wheel 3a and the right rear wheel 3b at speeds different from each other. The pivot turning state is realized by stopping one of the left rear wheel 3a and the right rear wheel 3b and forwardly or reversely driving the other. The spin turning state is realized by forwardly driving one of the left rear wheel 3a and the right rear wheel 3b and reversely driving the other.

The mower unit 4 includes a mower deck 4A consisting of a top plate and a side plate. In an inner space of this mower deck 4A, as indicated by dotted lines in FIG. 2, there are provided three blades 47 disposed side by side in the vehicle body transverse direction. Each blade 47 is supported to a drive shaft 48 rotatably supported to the top plate of the mower deck 4A. In order to transmit power from the output pulley 22 of the engine 20 to the respective drive shaft 48, the PTO transmission mechanism 40 is provided. This PTO transmission mechanism 40 includes input pulleys 41, 42, 43 fixed to the drive shafts 48 of the respective blades 47, a direction changing pulley 44, a tension clutch pulley acting as a PTO clutch 45, and an implement belt 46 entrained around the above-cited members. With this arrangement in operation, each blade 47 is rotated at a rotational speed in direct proportion to an engine rotational speed. The PTO clutch 45 is switched into an engaged state or a disengaged state by means of a clutch solenoid 45a. This clutch solenoid 45a is magnetized in response to an ON operation of the PTO clutch lever 18, whereby the PTO clutch 45 is engaged. The clutch solenoid 45a is demagnetized in response to an OFF operation of the PTO clutch lever 18, whereby the PTO clutch 45 is disengaged.

Figure 3:
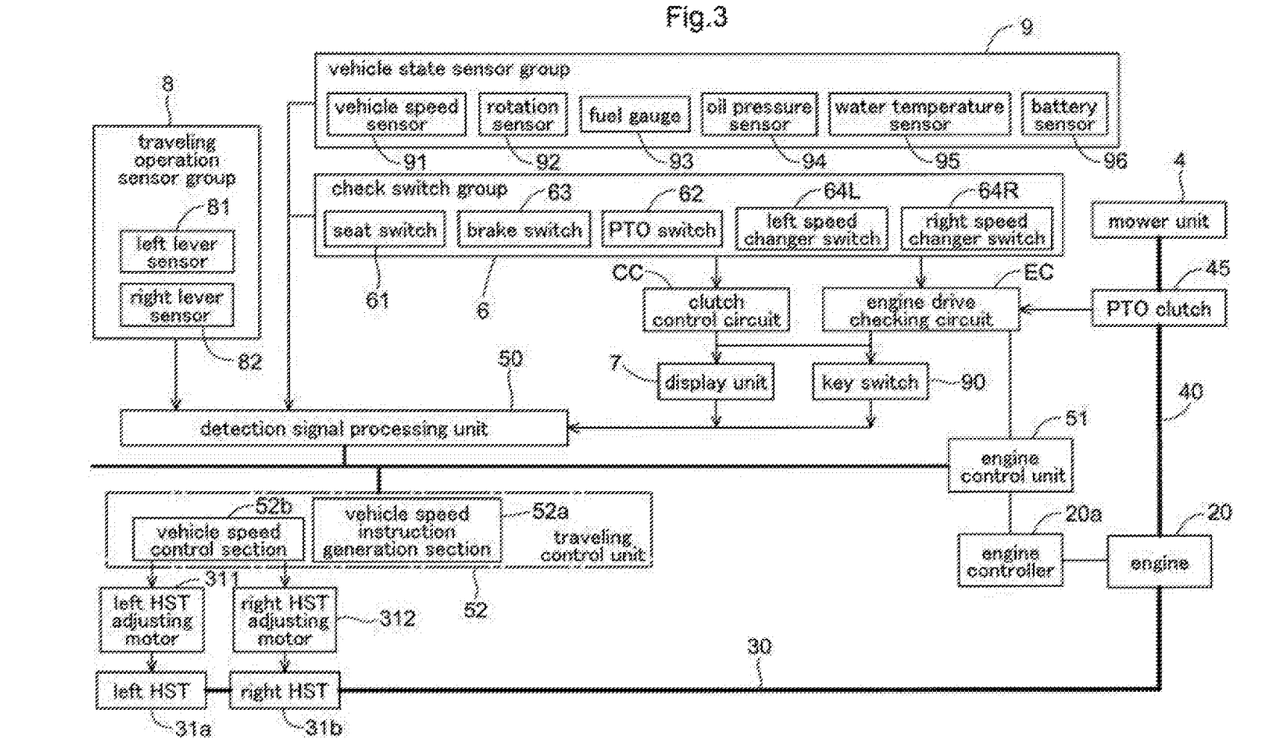
FIG. 3 is a functional block diagram of a control system of the grass mower.

A functional block diagram of a traveling control system of this grass mower is shown in FIG. 3. Core functional blocks in the traveling control system are a detection signal processing unit 50, an engine control unit 51 and a traveling control unit 52.

The detection signal processing unit 50 processes detection signals from a group of traveling operation sensors 8 and outputs result data. The traveling operation sensor group 8 includes a left lever sensor 81 for detecting a pivotal displacement of the left maneuvering lever 13a and a right lever sensor 82 for detecting a pivotal displacement of the right maneuvering lever 13b. In addition to these, the traveling operation sensor group 8 includes also an engine setting sensor for detecting a set value of an engine rotational speed setter (not shown) such as an accelerator lever, etc.

Further, to the detection signal processing unit 50, there is connected a key switch 90. The key switch 90, at its ON position, allows power supply to the respective electric devices and at a START position thereof, the engine 20 is started and at OFF position thereof, the engine 20 is stopped.

The engine control unit 51 controls driving of the engine 20 by giving control signals to an engine controller 20a. As this engine control unit 51 inputs various information relating to the engine 20, such as an engine rotational speed, a fuel supply amount, an oil pressure, an engine temperature, etc., then, based on such information, an abnormal state of the engine can be detected. Upon detection of such abnormal state, an abnormal state detection signal or an emergency signal for resolving the abnormal state will be outputted.

The traveling control unit 52 effects calculation processing of the detection result data outputted from the detection signal processing unit 50 and generates signals for operating the devices mounted on this grass mower. The traveling control unit 52 includes a vehicle speed instruction generation section 52a and a vehicle speed control section 52b.

The vehicle speed instruction generation section 52a and the vehicle speed control section 52b are provided in case maneuvering using the maneuvering unit 13 is effected by a by-wire method. In a further embodiment wherein such by-wire method is not used and the maneuvering unit 13 and the left and right HST's 31 are connected via physical linkage, the vehicle speed instruction generation section 52a, the vehicle speed control section 52b, a left HST adjusting motor 311, and a right HST adjusting motor 312 can be omitted. In the by-wire method, the vehicle speed instruction generation section 52a generates a vehicle speed instruction based on detection signals from the left lever sensor 81 and the right lever sensor 82 and gives this instruction to the vehicle speed control section 52b. Then, based on the vehicle speed instruction (left vehicle sped instruction, right vehicle speed instruction), the vehicle speed control unit 52b generates a control signal for controlling the rear wheel unit 3. More particularly, the control signal generated based on the left vehicle speed instruction is given to the left HST adjusting motor 311. With this, the swash plate angle of the left HST 31a is adjusted and the left rear wheel 3a is set to a vehicle speed based on the user operation. Similarly, the control signal generated based on the right vehicle speed instruction is given to the right HST adjusting motor 312. With this, the swash plate angle of the right HST 31b is adjusted and the right rear wheel 3b is set to a vehicle speed based on the user operation.

In the functional block diagram of FIG. 3, there are shown a clutch control circuit CC and an engine drive checking circuit EC. The clutch control circuit CC has a function of switching OFF (power disconnection) the PTO clutch 45 of the PTO transmission mechanism 40 at the time of abnormal operation of the engine. The engine drive checking circuit EC has a function for safely driving the engine 20 and a function of displaying any inconvenient conditional event for driving the engine 20. The clutch control circuit CC and the engine drive checking circuit EC are connected to a group of check switches 6, the display unit 7, the key switch 90 and the engine controller 20a.

The check switch group 6 generically refers to a group of check switches for use in checking safe states and no-safe states for safe driving of the engine 20 and each of these switches is selectively switched to either a safe position (closed position of the switch) corresponding to the safe state or a non-safe position (opened position of the switch). In the instant embodiment, the check switch group 6 includes a seat switch 61, a PTO switch 62, a brake switch 63, and a speed changer switch 64. In a different embodiment, at least one of the seat switch 61, the PTO switch 62, the brake switch 63 and the speed changer switch 64 may be omitted or other switch(es) than these can be included in the check switch group 6 also if desired.

The seat switch 61 is disposed at the driver's seat 12 and detects whether a driver is seated at the driver's seat 12 (switch closed: ON) or not (switch opened: OFF). The PTO switch 62 includes a first switch portion 62a and a second switch portion 62b which respectively are switched over in the switch state in association with an operation on the PTO clutch lever 18. In response to an ON (power transmission) operation on the PTO clutch lever 18, the first switch portion 62a is opened and the second switch portion 62b is closed. In response to an OFF (no power transmission or transmission disconnection) operation on the PTO clutch lever 18, the first switch portion 62a is closed and the second switch portion 62b is opened.

The brake switch 63 detects whether a brake (not shown) operably by an operation on the brake pedal 19 is under a braking state (switch closed: ON) or a non-braking state (switch opened: OFF). The speed changer switch 64 consists of a left speed changer switch 64L for detecting whether the left HST 31 as the left speed changer device is under a neutral state (switch closed: ON) or non-neutral state (switch opened: OFF) and a right speed changer switch 64R for detecting whether the right HST 31 as the right speed changer device is under a neutral state (switch closed: ON) or non-neutral state (switch opened: OFF).

Figure 4:
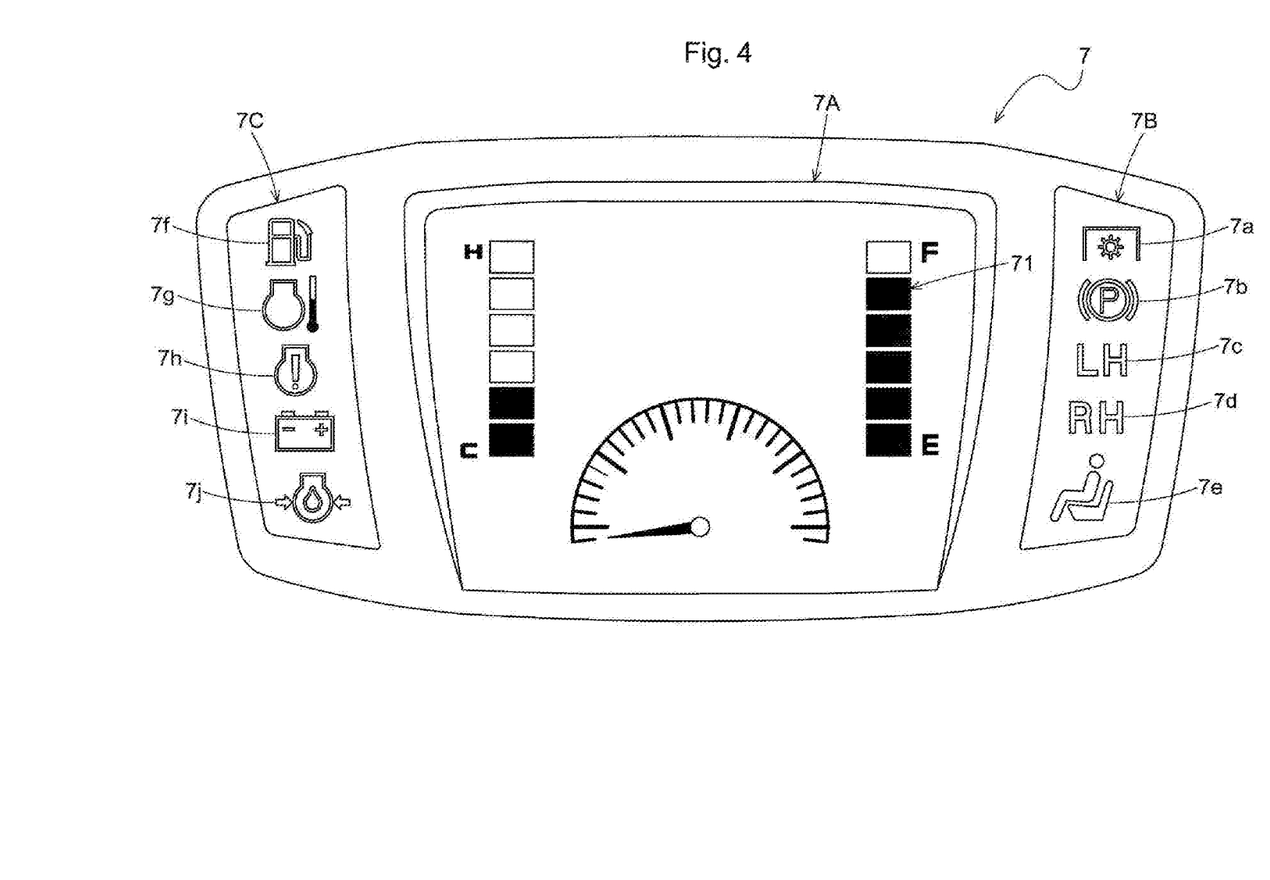
FIG. 4 is a screen view showing one example of screen of a display unit.

In the instant embodiment, the display unit 7, as shown in FIG. 4, consists of a center meter portion 7A, a right LED lamp display portion 7B located on the right side of this meter portion 7A and a left LED lamp display portion 7C located on the left side of the same. In the meter portion 7A, there are provided a semi-circular meter for displaying an engine rotational speed, a left vertical meter for displaying water temperature of engine cooling water, and a right vertical meter for displaying a remaining fuel amount inside the fuel tank.

The right LED lamp display portion 7B is used as a display for displaying switch states of the check switch group 6, in which a first LED 7a, a second LED 7b, a third LED 7c, a fourth LED 7d, and a fifth LED 7e are disposed in this order from the upper side. All of these are green LED lamps. In the instant embodiment, the first LED 7a is provided with an icon indicating the non-transmitting state of the PTO transmission mechanism 40, the second LED 7b is provided with an icon indicating the ON state of the brake, the third LED 7c is provided with an icon indicating the neutral state of the left maneuvering lever 13a (characters "LH"), the fourth LED 7d is provided with an icon indicating the neutral state of the right maneuvering lever 13b (characters "RH"), and the fifth LED 7e is provided with an icon indicating seated state of a driver. With illumination of the respective LED lamps of the right LED lamp display portion 7B, it can be confirmed that safe driving of the engine 20 is possible. For instance, if the third LED 7c and the fourth LED 7d are illuminated to display the left neutral icon and the right neutral icon respectively, this means that the left maneuvering lever 13a and the right maneuvering lever 13b are under the neutral states. Therefore, under this state, even if the engine 20 is started by operating the key switch 90, there is no risk of moving of the vehicle body 1. If either the left maneuvering lever 13a or the right maneuvering lever 13b is not under the neutral state, there exists possibility of moving of the vehicle body 1. So, safety control measure is provided not to allow driving of the engine 20 in such case. Thus, if the engine 20 is not driven in spite of an attempt for starting the engine 20 with operation of the key switch 90, by checking non-lit display, the driver can grasp the cause of this driving inability.

The left LED lamp display portion 7C is used as an alarm display portion (third display area) for displaying alarm data indicating results relating to alarm, in which a sixth LED 7f, a seventh LED 7g, an eighth LED 7h, a ninth LED 7i, and a tenth LED 7j are disposed in this order from the upper side. All of these are red LED lamps. In the instant embodiment, the sixth LED 7f is provided with an icon indicating fuel depletion, the seventh LED 7g is provided with an icon indicating overheating, the eighth LED 7h is provided with an icon indicating engine problem, and the ninth LED 7i is provided with an icon indicating insufficient battery charge, and the tenth LED 7j is provided with an icon indicating oil pressure shortage, respectively.

Figure 5:
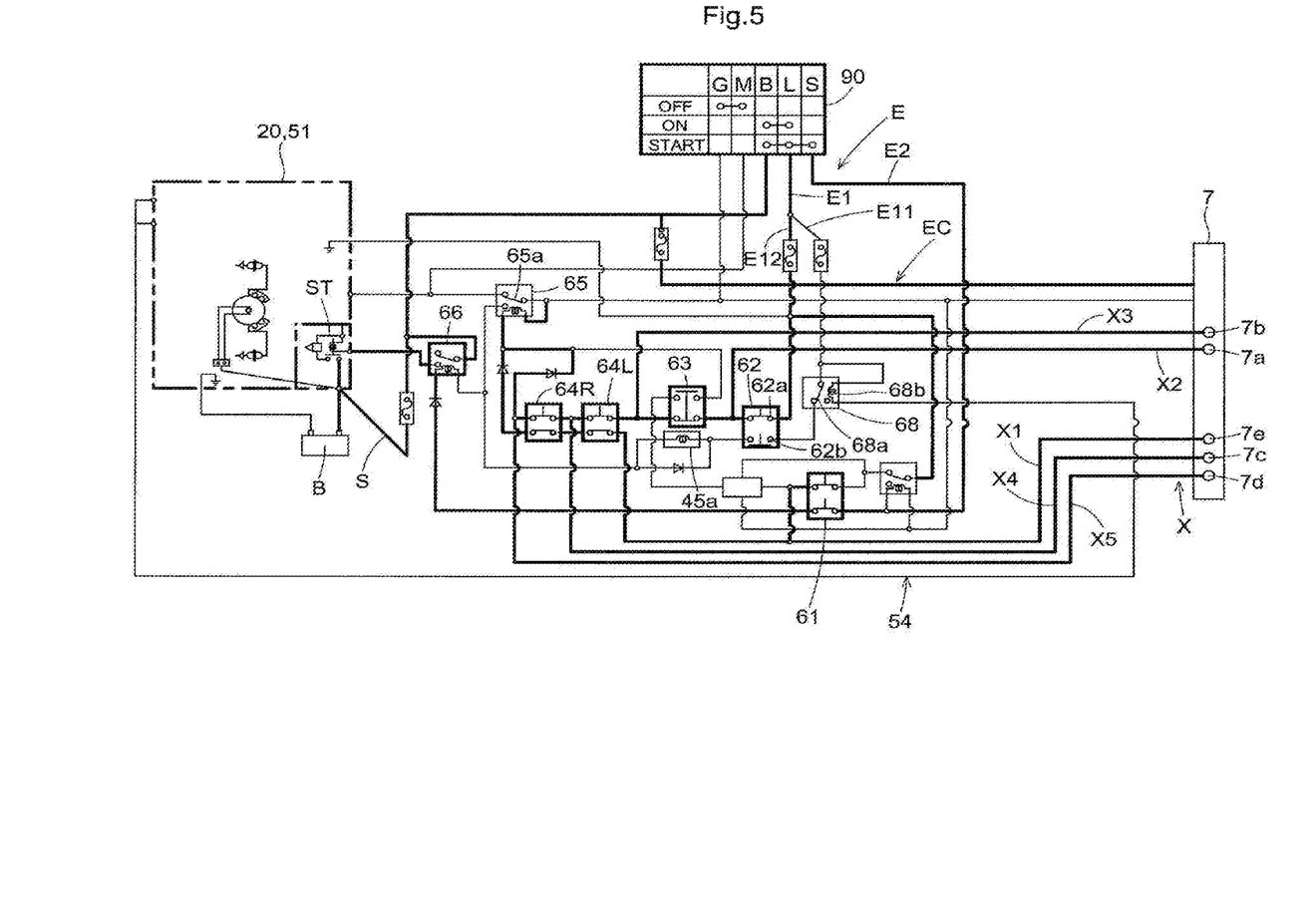
FIG. 5 is an electric circuit diagram showing an engine drive checking circuit with emphasis.

The key switch 90 includes a G terminal, an M terminal, a B terminal, an L terminal and an S terminal, the G terminal being the ground terminal. When the key switch 90 is at its OFF position, the G terminal and the M terminal are connected, the B terminal is connected to the battery B, the L terminal is connected to a first power supply control line E1 and the S terminal is connected to a second power supply control line E2. When the key switch 90 is at its ON position, the B terminal and the L terminal are connected. When the key switch 90 is at its START position, the B terminal, the L terminal and the S terminal are connected to each other.

In FIG. 5, there is shown an electric circuit provided among the check switch group, the engine control unit 51, the key switch 90, the display unit 7 and the PTO clutch 45. In this electric circuit, the constituent elements of the engine drive checking circuit EC are shown with emphasis.

Next, with reference to FIG. 5, the engine drive checking circuit EC will be explained. This engine drive checking circuit EC includes the key switch 90, a power supply line S, a power supply control line E, a display signal line X and the check switch group 6 (group of check switches).

The power supply control line E includes a first power supply control line E1 and a second power supply control line E2. The first power supply control line E1 and the second power supply control line E2 control ON/OFF switching of a starter relay. When the starter relay is switched ON, power is supplied from the battery B via the power supply line S to a starter ST which is one of the engine controllers 20a.

The first power supply control line E1 is connected to the L terminal of the key switch 90. The first power supply control line E1 incorporates the brake switch 63, the first switch portion 62a of the PTO switch 62, the left speed changer switch 64L, the right speed changer switch 64R, and the coil of the first relay 65 in series. The second power supply control line E2 is connected to the S terminal of the key switch 90. The second power supply control line E2 incorporates the seat switch 61 and the coil of the second relay 66 in series. One contact of the first relay 65 is connected to the second power supply control line E2 and the other contact thereof is grounded. One contact of the second relay 66 is connected to the battery B and the other contact thereof is connected to the coil of the starter relay.

With the above-described arrangement in operation, if the key switch 90 is operated to the START position and the seat switch 61, the brake switch 63, the first switch portion 62a of the PTO switch 62, the left speed changer switch 64L and the right speed changer switch 64R are all closed, then, the coil of the first relay 65 is supplied with power via the first power supply control line E1 and the first relay 65 is switched ON. Further, if the seat switch 61 is closed, then, the coil of the second relay 66 is supplied with power via the second power supply control line E2 and the second relay 66 is switched ON. As a result, the starter relay is turned ON and power is supplied to the starter ST via the power supply line S, so the engine 20 is driven. Incidentally, even if the key switch 90 is switched from the START positon to the ON position, since the ON state of the first relay 65 is maintained by the first power supply control line E1, so the ON states of the second relay 66 and the starter relay are also maintained, so the engine 20 is driven. In this, if even one of the group of check switches (check switch group) 6 is opened, the second relay 66 is switched OFF, so the starter relay is switched OFF and the engine 20 is stopped.

The display signal line X has a function of connecting the check switch group 6 to the right LED lamp display portion 7B of the display unit 7. In the instant embodiment, the display signal line X includes a first display signal line X1, a second display signal line X2, a third display signal line X3, a fourth display signal line X4 and a fifth display signal line X5. The first display signal line X1 branches the current flown through the seat switch 61 to the display unit 7. With this, the fifth LED 7e is lit, so that it is confirmed that a diver is seated. The second display signal line X2 branches the current flown through the first switch portion 62a of the PTO switch 62 to the display unit 7. With this, the first LED 7a is lit, so that it is confirmed that the PTO transmission mechanism 40 is under the non power transmission state. The third display signal line X3 branches the current flown through the brake switch 63 to the display unit 7. With this, the second LED 7b is lit, so that it is confirmed that the brake is under the ON state (braking state). The fourth display signal line X4 branches the current flown through the left speed changer switch 64L to the display unit 7. With this, the third LED 7c is lit, so that it is confirmed that the left maneuvering lever 13a is under the neutral state. The fifth display signal line X5 branches the current flown through the right speed changer switch 64R to the display unit 7. With this, the fourth LED 7d is lit, so that it is confirmed that the right maneuvering lever 13b is under the neutral state. Incidentally, in the instant embodiment, the brake switch 63, the left speed changer switch 64L and the right speed changer switch 64R are connected in series in this order on the downstream side of the PTO switch 62 in the current flow direction. Thus, if the first switch portion 62a of the PTO switch 62 is opened (power transmission state), the second LED 7b, the third LED 7c and the fourth LED 7d are not lit. In this case, by firstly switching the PTO switch 62 to the ON position, the brake state, the positions of the left maneuvering lever 13a and of the right maneuvering lever 13b can be checked one after another.

In the foregoing embodiment, it was explained with citing the starter ST as the engine controller 20a. However, the engine controller 20a includes, in addition thereto, an igniter, a fuel injection pump, and a fuel valve, and for these devices too, like the starter ST, power supply control is effected under the switched states of the check switch group 6.

In the foregoing embodiment, a grass mower was cited as a work vehicle. However, the present invention is applicable also to various work vehicles such as a snow plowing vehicle, a liquid agent spraying vehicle, etc.

The invention claimed is:

1. A work vehicle comprising:
an engine controller driving an engine;
a plurality of check switches that are switchable between a safe position corresponding to safe drive of the engine and a non-safe position, the plurality of check switches including at least a first check switch and a second check switch;
a power supply line having a power supply relay, the power supply line supplying electric power to the engine controller when the power supply relay is ON;
a first power supply control line incorporating at least the first check switch and a first relay, and a second power supply control line incorporating at least the second check switch and a second relay, the first power supply control line rendering the first relay ON when at least the first check switch is switched to the safe position and the second power supply control line rendering the second relay ON when at least the second check switch is switched to the safe position;
a display for displaying a switched state of each of the plurality of check switches, the display indicating that the work vehicle may be driven safely; and
a plurality of display signal lines respectively connecting each check switch of the plurality of check switches to the display, each display signal line of the plurality of display signal lines transmitting a signal indicative of the switched state of the respective check switch.

2. The work vehicle of claim 1, wherein the plurality of check switches includes:
a seat switch as the second check switch for detecting whether a driver's seat is under a seated state or not,
a brake switch as the first check switch for detecting whether a brake is under a braking state or not,
a PTO switch for detecting whether a PTO clutch for switching transmission state of a PTO mechanism is under a transmitting state or not,
a first speed changer switch for detecting whether a first speed changer device is under a neutral state or not, and
a second speed changer switch for detecting whether a second speed changer device is under a neutral state or not.

3. The work vehicle of claim 2, wherein:
the display includes:
a seat lamp, operably coupled to the seat switch, for indicating the seated state;
a brake lamp, operably coupled to the brake switch, for indicating the braking state;
a PTO lamp, operably coupled to the PTO switch, for indicating the transmitting state;
a first neutral lamp, operably coupled to the first speed changer switch, for indicating the neutral state of the first speed changer device;
a second neutral lamp, operably coupled to the second speed changer switch, for indicating the neutral state of the second speed changer device; and
each respective display signal line provides a path for current to travel from each respective check switch to the display when each respective check switch is switched to the safe position.

4. The work vehicle of claim 2, wherein:
the first speed changer device is operably connected to a first maneuvering lever for controlling a first wheel,
the second speed changer device is operably connected to a second maneuvering lever for controlling a second wheel, and
the first wheel is controlled independently of the second wheel.

5. The work vehicle of claim 1, wherein:
there is provided a key switch having an OFF position, an ON position and a START position; and
when the key switch is at the ON position or the START position and each of the plurality of check switches is respectively switched to the safe position, the power supply line is supplied with power and the power supply relay is switched ON.

* * * * *